Inventors:
Paul S. Swartz;
Howard R. Hart, Jr.,
by
Their Attorney.

Inventors:
Paul S. Swartz;
Howard R. Hart, Jr.,
by
Their Attorney.

# United States Patent Office 3,333,218
Patented July 25, 1967

3,333,218
SUPERCONDUCTIVE ELECTRONIC DEVICE
Paul S. Swartz and Howard R. Hart, Jr., Schenectady, N.Y., assignors to General Electric Company, a corporation of New York
Filed Nov. 2, 1964, Ser. No. 408,295
5 Claims. (Cl. 335—216)

The present invention relates generally to the field of superconductivity and is more particularly concerned with a novel device having the unique ability to rectify supercurrents.

We have made the surprising and unpredictable discovery that in bodies of certain geometry and materials and under certain circumstances externally-applied supercurrents can be rectified. We have further found that this effect is most pronounced in the surface portions of such bodies and that the effect is maximized in a surface portion where there is no second surface parallel or nearly parallel to the surface in which the rectification effect is desired. Still further, we have obtained evidence that the externally-applied supercurrents are carried by such a surface when it is in the mixed state and when the magnetic field is parallel to the surface plane. Thus, the surface of a type II superconductor rectifies externally-applied supercurrents when a magnetic field vector is applied parallel to the surface and perpendicular to the current direction.

Broadly defined, a device embodying the aforesaid discoveries and the inventive concept based thereon comprises a body of superconductive material which has a first surface portion that is capable of supporting externally applied supercurrents and a second surface portion which is not capable of supporting such supercurrents. The device also includes magnetic means for rectifying externally-applied currents in the first surface portion and this means includes a magnetic field source, the magnetic field vector of which is disposed substantially parallel to the first surface of the body and substantially perpendicular to the direction of the externally-applied supercurrent travel along this first surface portion. The body of this device may take a variety of forms and it may be composed of any of the many different type II superconductive materials. Preferably, the body is elongated and either in the form of a ribbon or in generally cylindrical form but having a transverse cross section of isosceles-triangle shape. Suitably, in the case of the ribbon, either the top or the bottom surface is capable of supporting the supercurrents to be rectified while the other surface is not capable of supporting such currents. In the cylindrical body case, all three side faces of the body may be essentially the same and have therefore approximately the same capability in respect to the support of externally-applied supercurrents. The material employed in the production of these bodies may be an alloy or an intermetallic compound now known having in general the type II superconductor characteristics typified by certain lead-thallium alloys to be described below.

In the drawings accompanying and forming a part of this specification:

Figure 1:
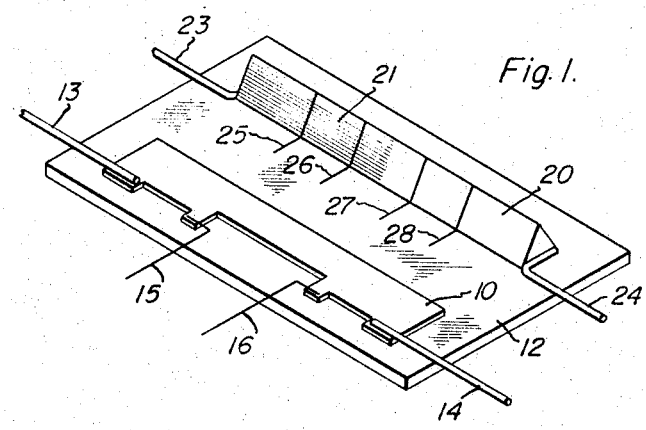
FIG. 1 is a perspective view of two bodies of superconductive material in preferred form for use in electronic devices of this invention.
Figure 2:
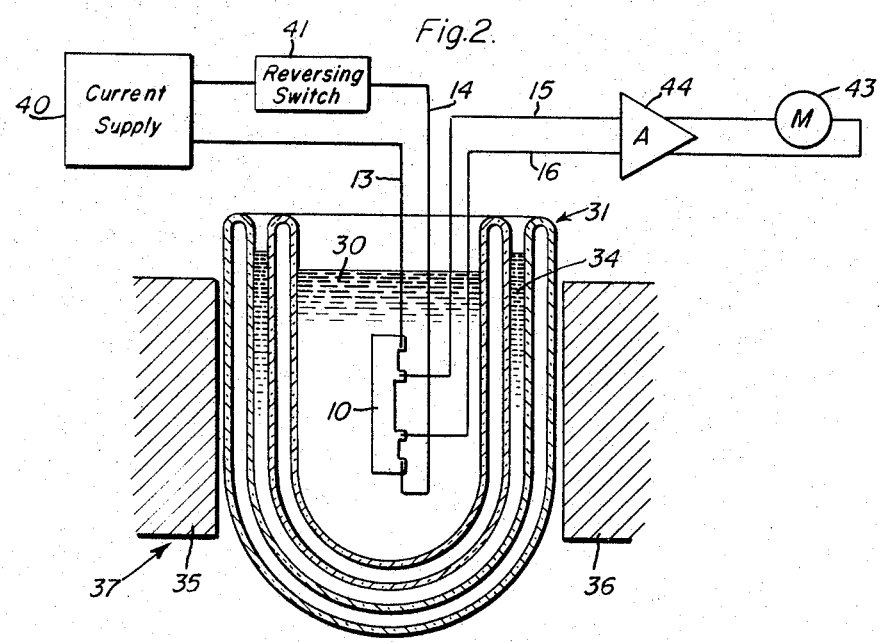
FIG. 2 is a fragmentary vertical sectional view of a device representing a preferred embodiment of this invention.

With reference to FIGS. 1 and 2, the body of this inventive device may take alternative or varying forms as indicated above, preferably either of the two forms illustrated in FIG. 1. In this drawing, body 10 is a ribbon of lead-thallium alloy ($Pb_{.95}Tl_{.05}$) disposed on a glass supporting plate 12. A glass cover plate (not shown) is provided to maintain body 10 in position and indium current leads 13 and 14 are soldered to tabs at the ends of body 10. Voltage leads 15 and 16 are connected to central tabs on the body as the drawing indicates.

Body 20 is a cylinder of triangular cross section of the alloy of body 10 and is likewise mounted on glass plate 12 and maintained in position by a cover plate (not shown). Body 20, however, is further provided with a copper plate 21 over approximately one-half its length for a purpose to be described. Again, indium current leads 23 and 24 are soldered to the two ends of body 20 and two sets of voltage leads are connected to the intermediate portions of body 20. One set of voltage leads 25 and 26 is secured to the copper plate section of body 20 while the other set including leads 27 and 28 is connected to the intermediate portion of body 20.

In FIG. 2, body 10 is illustrated as submerged in a body 30 of liquid helium contained in a Dewar flask 31, between the inner and outer walls of which a body of liquid nitrogen 34 is provided for insulation purposes. Body 10 is shown in FIG. 2 without its glass base and cover plate assembly and is situated in Dewar 31 so as to be located centrally between the two poles 35 and 36 of an electromagnet 37 shown only fragmentarily. Magnet 37 is mounted so as to be rotatable relative to flask 31 and body 10 whereby the magnetic field vector of the field to which body 10 is subjected can be changed in angular relation to the surface portions of body 10 through which externally-applied supercurrents flow during operation of the apparatus of FIG. 2.

Supercurrents in body 10 in FIG. 2 are produced by a current supply indicated at 40 and are reversed in polarity by reversing switch indicated at 41. Voltage drop through body 10 is measured by meter 43 after amplification by an amplifier indicated at 44 connected to voltage leads 15 and 16.

Figure 3:
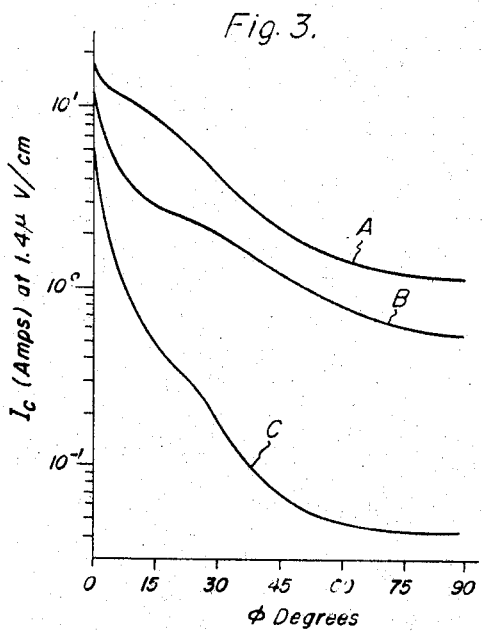
FIG. 3 is a chart bearing curves illustrating the dependence of critical current upon the angular relation of the vector of the magnetic field applied to three ribbon specimens in an electronic device of this invention.

Using the four-probe technique of FIG. 2, measurements of supercurrents flowing in body 10 are made by passing D.C. current through body 10 in the operation of current supply 40 and reversing switch 41 and by measuring then the voltage drop by means of amplifier 44 and meter means 43. The critical current $I_c$ is defined as the current yielding a voltage drop 1.4 $\mu v./cm$. The variables are state of body 10 and the magnitude H and direction of the applied D.C. magnetic field, that is, the field produced by magnet 37. In the FIG. 2 arrangement, the externally-applied currents flowing in body 10 travel in a direction perpendicular to the field applied by magnet 37. Thus, angle $\theta$ equals 90°. By rotating the field, that is, turning the magnet relative to the plane of the surface of body 10 (the azimuthal angle $\phi$ defined as zero when the field is in the plane of the surface), readings are taken in terms of the dependence of $I_c$ on angle $\phi$ with the results illustrated by the curves on the chart of FIG. 3.

Thus, using as a sample or test specimen a body 10 in ribbon form measuring 2 in. x .25 in. x .003 in. was cut into three sections. The operation described just above was carried out with readings taken at varying magnetic field vector angles (angle $\phi$) from 0 to 90°. In one of these operations, body 10 was as-rolled ribbon, that is, it was cut from an as-rolled sheet of lead-thallium ribbon, and the results of the test are indicated by Curve A of FIG. 3. The second run involved a sample body 10 cut from the same ribbon and annealed for one week at 300° C. The results obtained in a duplicate of the above test are illustrated by Curve B of FIG. 3. In the third run, another sample of body 10 was cut from the same piece of as-rolled ribbon stock and annealed at 320° C. for one week and then annealed for a few minutes at 325° C. The results obtained in the test of this third specimen are shown by Curve C of FIG. 3. The results shown in FIG. 3 establish that annealing increases the angular anisotropy of the critical current $I_c$ yielding a very sharp peak when the field direction is parallel to the surface which is carrying the externally-applied supercurrents (i.e., when angle $\phi$ equals zero). This suggests that this surface carries the supercurrents or, equivalently, strongly retards transverse motion of flux and this conclusion is reinforced by the results indicated in each of the other charts of FIGS. 4, 5 and 6.

Figure 4:
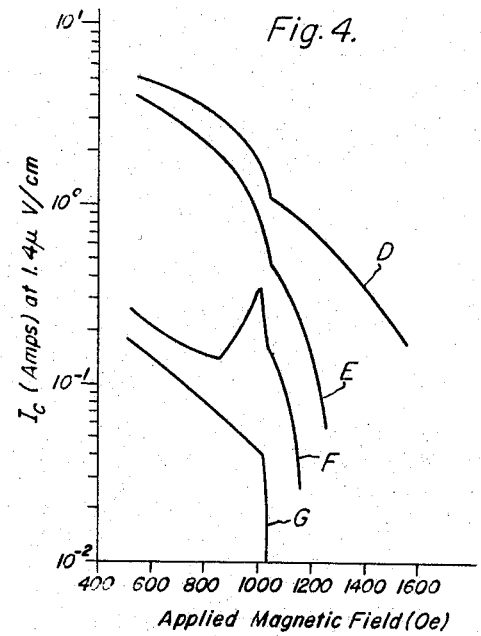
FIG. 4 is another chart bearing curves illustrating the dependence of critical current upon angularity of the magnetic field vector for plated and unplated samples of lead-thallium alloy ribbon in one of the present devices.

In FIG. 4, the results obtained for angle $\phi$ values of 2° and 30° (angle $\theta=90°$) using annealed plated and unplated ribbon samples are shown in a series of four curves. In this case, four different samples like body 10 all cut from the same as-rolled lead-thallium ($Pb_{.95}Tl_{.05}$) alloy ribbon stock were subjected to the operation described above with readings at frequent intervals as the applied magnet field was increased. Thus, in the case of Curve D, the test specimen is annealed but unplated while in the case of Curve E, the specimen is copper plated. While Curves D and E represent an angle $\phi$ of 2°, Curves F and G represent the same operation using the same test pieces for angle $\phi$ of 30°. Measurements in the cases of the unplated ribbon test pieces for angle $\phi$ 2° and 30° (Curves D and F, respectively) are for applied magnetic field between about 500 oersteds and 1200 to 1500 oersteds. Over the same applied magnetic field range, Curves E and G show the effect of copper plating in descreasing or diminishing the critical current at any field above $H_{c2}$ where $H_{c1}$ is approximately 350 oersteds and where $H_{c2}$ is approximately 1030 oersteds.

Figure 5:
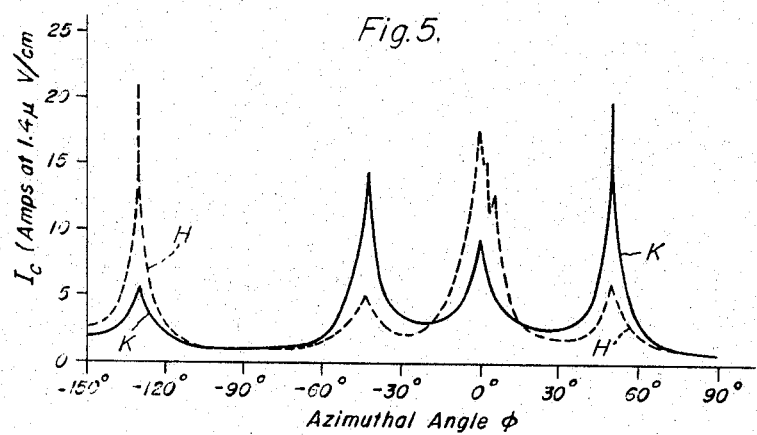
FIG. 5 is a chart bearing curves illustrating the results obtained for an annealed, unplated, triangular cross-section cylindrical body of the type II superconductor used in the present invention device.

Using body 20 as a test specimen in the apparatus of FIG. 2, results indicated by the two curves on the chart of FIG. 5 were obtained. Critical current was again plotted against azimuthal angle $\phi$ and the test specimen was subjected to a magnetic field of 700 oersteds at all times. Curve H represents the values obtained in an operation following the description of FIG. 2 using a lead-thallium alloy cylinder of triangular cross section (FIG. 1) but with current flow in the negative direction. Curve K then represents the results obtained where the supercurrent externally applied to the specimen was flowing in the positive direction. The sharp peaks described by Curves H and K are associated with the triangular surfaces or sides of body 20 and not with any rolling plane. It is also apparent that the critical current obtained depends not only on the angle that the vector of the applied magnetic field makes with the surface carrying the externally-applied supercurrent but also on the polarity of that supercurrent. The high and low peaks interchange polarity as succeeding surfaces of the triangular cross-section body are made parallel with the vector of the applied magnetic field and the reversal of the field direction ($\phi=-130°$ and $+50°$) simply interchanges the peak polarities. Thus, the flux is demonstrated to move more easily under the influence of the Lorentz force from within the sample to the outside than from the outside of the sample to the interior. It is noted also that a partial rectification effect is obtained.

Figure 6:
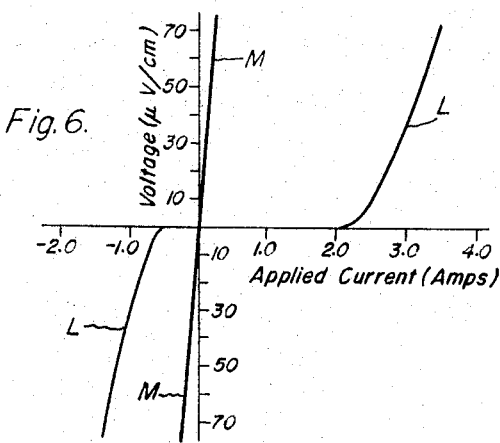
FIG. 6 is a chart on which voltage is plotted against applied current to illustrate the supercurrent rectification effect obtained through the use of this invention.

The chart of FIG. 6 demonstrates the partial rectification of an externally-applied supercurrent. The data represented by Curve L of FIG. 6 on which voltage is plotted against applied current was gathered using the apparatus of FIG. 2 and the uncoated portion of body 20. Again, body 20 was well annealed as described above. The applied field was 700 oersteds and angle $\phi$ was $+50°$ throughout the experiment. Curve M illustrates the effect obtained where the applied field was 2000 oersteds and the vector of the applied field was normal to the surface of body 20 and to the direction of externally-applied current flow along that surface; the sample was in the normal state and no rectification was observed. It is noted in respect to Curve L that initially the voltage increases exponentially with increasing current but becomes linear in current as the current is further increased.

Having thus described this invention in such full, clear, concise, and exact terms as to enable any person skilled in the art to which it apertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, part of the specifically-described embodiments of the invention may be made without departing from the scope of the invention as set forth in what is claimed.

What we claim as new and desire to secure by Letters Patent of the United States is:

1. An electronic device comprising a body of superconductive material having a first surface portion capable of supporting externally-applied supercurrents and a second surface portion not capable of supporting externally-applied supercurrents, and magnetic means for rectifying externally-applied currents in the said first surface portion including a magnetic field source the magnetic field vector of which is substantially parallel to the first said surface and is substantially perpendicular to the direction of externally-applied supercurrent travel along said first surface portion.

2. An electronic device comprising an elongated body of superconductive material having a triangular transverse cross-section and having a first side the surface of which is capable of supporting externally-applied supercurrents and magnetic means for rectifying externally-applied currents in the said first side surface portion including a magnetic field source the magnetic field vector of which is substantially parallel to the first side surface and is substantially perpendicular to the direction of externally-applied supercurrent travel along said first side surface.

3. An electronic device comprising a ribbon of superconductive material having a top surface portion capable of supporting externally-applied supercurrents and a bottom surface portion not capable of supporting externally-applied supercurrents, and magnetic means for rectifying externally-applied currents in the said top surface portion including a magnetic field source the magnetic field vector of which is substantially parallel to the top surface and is substantially perpendicular to the direction of externally-applied supercurrent travel along said top surface.

4. An electronic device comprising a ribbon of superconductive material having a first surface portion capable of supporting externally-applied supercurrents and a copper plated second surface portion not capable of supporting externally-applied supercurrents, and magnetic means for rectifying externally applied currents in the said first surface portion including a magnetic field source the magnetic field vector of which is substantially parallel to the first said surface and is substantially perpendicular to the direction of externally-applied supercurrent travel along said first surface.

5. An electronic device comprising an elongated body of superconductive material having a triangular transverse cross-section lead having a first side, said first side having a surface portion capable of supporting externally-applied supercurrents and having another surface portion coated with copper and consequently not capable of supporting externally-applied supercurrents, and magnetic means for rectifying externally-applied currents in the said first surface portion including a magnetic field source the magnetic field vector of which is substantially parallel to the first said surface and is substantially perpendicular to the direction of externally-applied supercurrent travel along said first surface.

No references cited.

BERNARD A. GILHEANY, *Primary Examiner.*

G. HARRIS, *Assistant Examiner.*